United States Patent [19]
Grouwinkel et al.

[11] 3,884,267
[45] May 20, 1975

[54] DIRECT-ACTING TWO-WAY CONTROL VALVE
[75] Inventors: George F. Grouwinkel, Manhatten Beach; James W. Hager, San Marino, both of Calif.
[73] Assignee: Moog Inc., East Aurora, N.Y.
[22] Filed: Oct. 18, 1973
[21] Appl. No.: 407,517

[52] U.S. Cl. ........... 137/625.33; 137/607; 251/282; 251/335 R
[51] Int. Cl. ............................................. F16k 1/32
[58] Field of Search..... 137/625.33; 251/282, 335 R

[56] References Cited
UNITED STATES PATENTS
1,044,828   11/1912   Stumpf.................. 137/625.33 UX
3,219,063   11/1965   Schumann.................. 137/625.33
3,373,769   3/1968   Chaves, Jr.................. 251/335 R X

FOREIGN PATENTS OR APPLICATIONS
20,966    2/1900   Switzerland.......................... 251/282
146,436   2/1903   Germany ............................ 251/282

Primary Examiner—Robert G. Nilson
Attorney, Agent, or Firm—Sommer & Sommer

[57]   ABSTRACT

A substantially pressure balanced twin poppet-type direct-acting two-way control valve comprising arcuately movable first and second closure parts cooperating with stationary seats so constructed that highly effective sealing is provided between cooperating closure part and seat when the valve is closed.

5 Claims, 11 Drawing Figures

DIRECT-ACTING TWO-WAY CONTROL VALVE

BACKGROUND OF THE INVENTION

1. Field of the Invention

The present invention relates to the field of direct-acting two-way control valves.

2. Prior Art

One application of direct-acting two-way control valves is in connection with thrustors used for attitude control in a missile or space vahicle. In such a thrustor, typically, a control valve controls the flow of a suitable fluid propellant to a hypergolic engine which converts the propellant to a pressurized jet stream discharged in a manner to produce thrust. The valve may control the flow of only a single fluid propellant which reacts with a catalytic bed in the engine in which case the valve is known as a monopropellant valve. A bipropellant valve controls the flow of two separate fluids, one fuel and the other oxidizer, which are combined in the engine to generate the thrust fluid.

Such a bipropellant valve is disclosed in U.S. Pat. No. 3,373,769 and comprises two chambers to which fuel and oxidizer are separately supplied and from which flow is metered by separate valve means acting in unison and each including a stationary valve seat and a valve closure rendered movable relative to said seat by virtue of being mounted on a pivoted member known as a flapper. This flapper is supported for frictionless pivotal movement on a flexure tube member which also seals off the corresponding one of said chambers from electromagnetic means for actuating movement of the flapper. Such means is a polarized torque motor including coils for receiving electrical command signals which induce movement of an armature connected to the flapper.

Engine thrust is related to the flow of propellant passed by the control valve. The size of the torque motor must be related to the size of the valve, the pressure being controlled and other design parameters such as vibration environment. Generally speaking, it is desired to increase the engine thrust without any more weight or envelope than is necessary to control the valve. Typically in the past, direct-acting control valves have been limited to engines of about 300 pounds thrust. For engines of higher thrust, valves with two or more stages have traditionally been used. Such valves create difficulties for checkout in that external fluid must be supplied for operation of subsequent stages.

The problem presented by a desire for higher engine thrust is how to increase fluid flow through a direct-acting control valve which requires a larger metering orifice without paying the price of providing a significantly larger valve and stronger and hence heavier and larger means for producing the larger actuation forces to operate the valve.

The prior art has offered solutions to this problem but none has been fully satisfactory prior to the advent of the present invention.

One solution proposed by the prior art was to interpose a pressure balancing bellows between the fluid propellant inlet chamber and the armature of the torque motor arranged so that increased pressure of the fluid upstream of the valve orifice was utilized to aid displacement of the armature in the direction induced by the electrical command signal for unseating the valve closure. This solution proved not to be practical because of increased cost and the complexity of adding the bellows which was also sensitive to vibration and subject to rupture.

Another solution proposed by the prior art also involved pressure balancing by interposing a bellows between the valve body downstream of the valve orifice and the movable valve closure with the interior of the bellows communicating with upstream pressure through a hole in the closure. This arrangement had the same drawbacks of the first mentioned prior art solution.

SUMMARY OF THE INVENTION

Accordingly, the primary object of the present invention is to provide a direct-acting two-way control valve which can meter an increased flow of fluid without having the disadvantages of the prior art valve which sought to accomplish the same end result.

More specifically, an object is to provide such a valve with increased flow control capacity without requiring increased actuation force for operation.

Another object is to provide such a control valve which is reliable and not subject to failure.

A further object is to provide such a control valve which is not subject to malfunction due to vibration.

Still another object is to provide such a control valve which is relatively simple in design and does not involve significant increased cost to manufacture.

These and other objects and advantages which will be apparent from the ensuing detailed description of preferred embodiments illustrated in the accompanying drawings, are achieved by a direct-acting two-way control valve including a valve body having first and second seats and fluid inlet and outlet chambers, poppet-type valve closure means including a first part engaging said first seat and a second part engaging said second seat, and electromagnetic actuation means for unseating said closure means, relative movement between said first part and first seat providing a first variable annular orifice having an upstream outer side and a downstream inner side, relative movement between said second part and second seat providing a second variable annular orifice having an upstream inner side and a downstream outer side, said inlet chamber communicating with said upstream outer side of said first orifice, said closure means having an internal passage establishing communication between said inlet chamber and said upstream inner side of said second orifice, and said outlet chamber communicating with said downstream side of each such orifice.

It is desired to provide each such valve seat with a large annular extent so that when its valve closure lifts off the seat a large control or metering orifice will be provided for relatively little valve closure lift or displacement and thereby give high controlled flow. However, the outlet chamber downstream of such orifices must be of sufficient cross-sectional area to handle the sum of the flows therethrough. If the valve seats are in the same plane, a downstream annulus of sufficient cross-sectional area can be provided by increasing the differences in the diameters of the orifices in order to handle the combined flow, but this is done at the price of losing pressure balance on the valve closure means for the upstream pressure tends to close one valve closure part and tends to open the other valve closure part.

Accordingly, it is preferred to arrange the valve seats in different and offset planes so that the effective areas of the valve seats can be closer in diameter in order to improve pressure balance while providing adequately sized downstream flow passages to handle the fluid passed through the variable orifices between the seats and the closure parts when the latter are unseated.

If, however, the difference in pressure balancing forces associated with having the two valve seats in the same plane is tolerable, then there is a lower manufacturing cost associated with fabrication of a valve of the coplanar seat configuration.

DETAILED DESCRIPTION OF THE PREFERRED EMBODIMENTS (Offset Valve Seats —Figs. 1 to 8)

Figures 1, 2, 3:
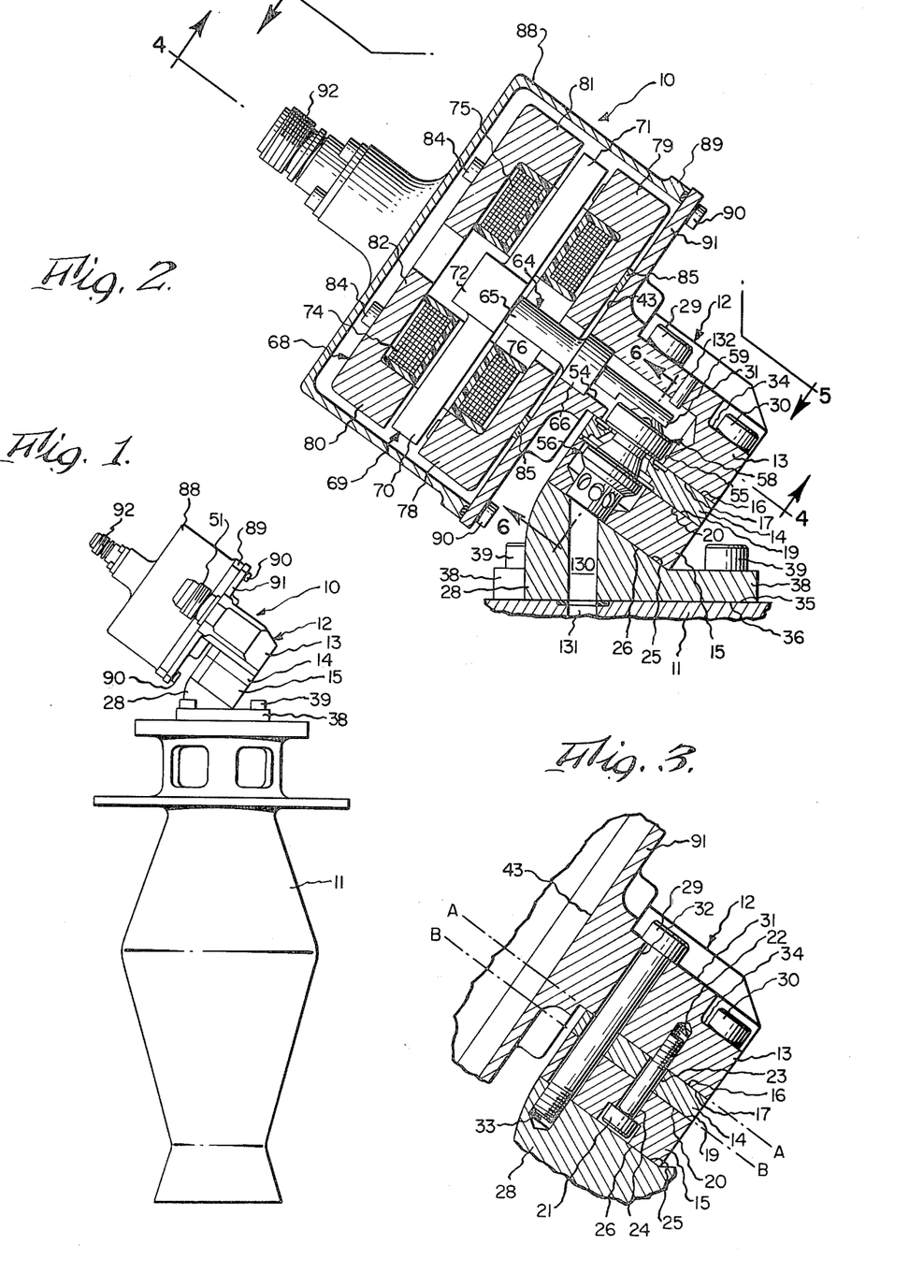
FIG. 1 is a side elevation view of a direct-acting two-way control valve embodying the present invention, specifically in the form of a bipropellant valve for controlling the flow of fuel and oxidizer to the injector of a hypergolic engine in response to electrical commands, and showing the same mounted on such engine, the control valve illustrated having its valve seats in offset planes.
FIG. 2 is an enlarged generally central longitudinal vertical sectional view of the control valve shown in FIG. 1, this view being taken generally along line 2—2 of FIG. 5.
FIG. 3 is a fragmentary vertical sectional view thereof taken generally on line 3—3 of FIG. 4.

The direct-acting two-way control valve is illustrated as being embodied in a bipropellant valve for controlling the flow of fuel and oxidizer to a hypergolic rocket engine. Referring to FIG. 1, the inventive control valve is represented generally by the numeral 10 and is shown as mounted on the injection head of a pulse-type hypergolic rocket engine 11 such as one which might be used for attitude control in a missile or space vehicle. The purpose of control valve 10 is to provide simultaneous on-off control of the bipropellants such as fuel and oxidizer used in the engine. Generally storable fuel propellants are used. Examples of fuel include 50/50 unsymmetrical dimethyhydrazine, hydrazine and monoethyhydrazine, and examples of oxidizer include nitrogen tetroxide and fuming nitric acid. Other high performance propellants made be used.

Control valve 10 is shown as including body means indicated generally at 12 which comprises a first or upper body section 13, a second or intermediate body section 14, and a third or manifold body section 15. Body sections 13 and 14 have opposing and contacting flat surfaces 16 and 17, respectively, these surfaces being coplanar with a plane of sealing represented by the line A—A. Body sections 14 and 15 have opposing and contacting flat surfaces 19 and 20, respectively, these surfaces being coplanar with a plane of sealing represented by the line B—B.

Figure 4:
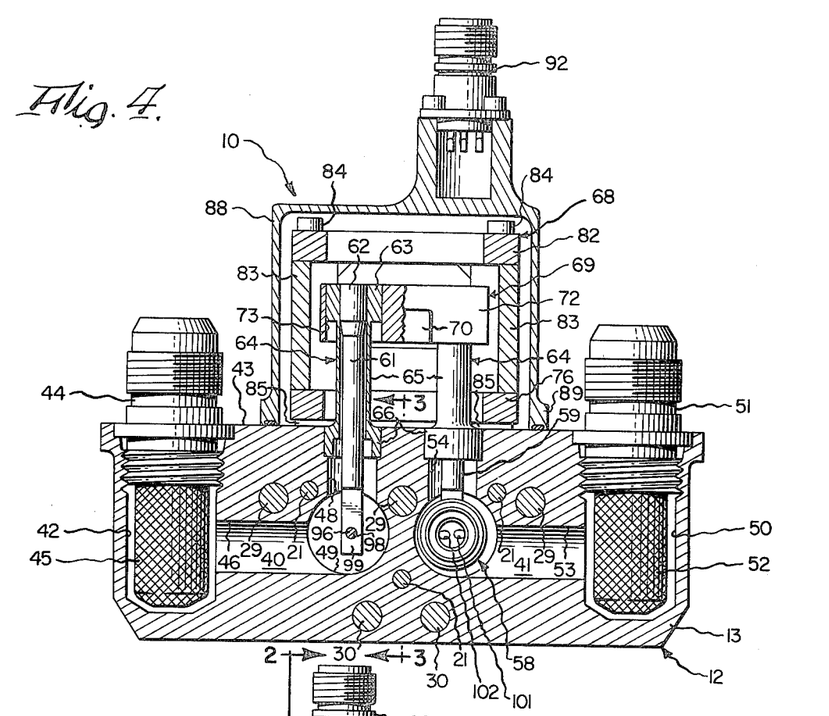
FIG. 4 is a transverse sectional view thereof taken generally on line 4—4 of FIG. 2.
Figure 5:
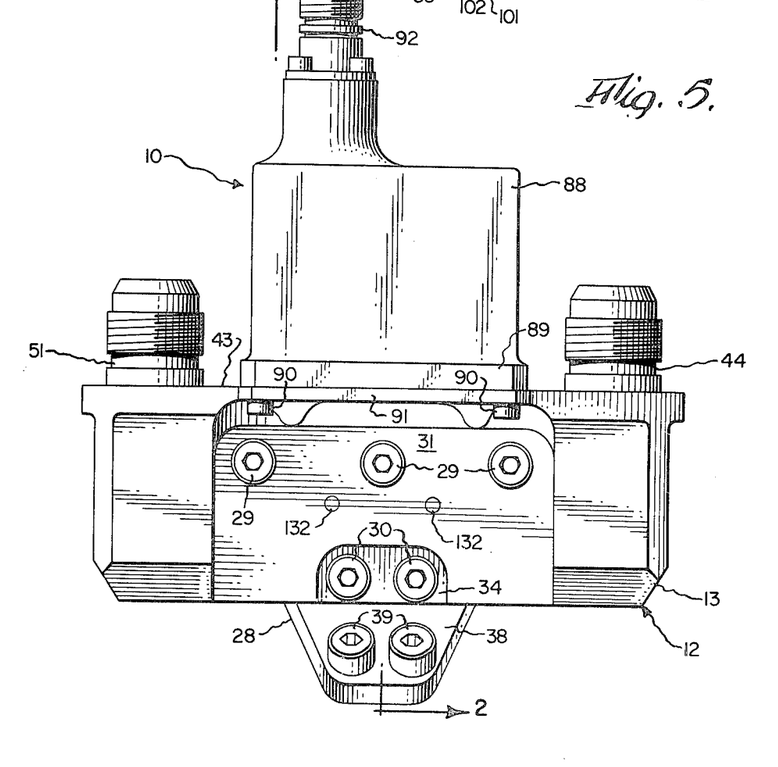
FIG. 5 is an end elevational view of the control valve and is taken generally on line 5—5 of FIG. 2.

Body sections 13–15 are shown as secured together by a plurality of cap screws 21, three such cap screws being shown in FIG. 4. More specifically, body 13 is shown in FIG. 3 as provided with an internally threaded recess 22 which is coaxial with a through-hole 23 provided in body section 14, and this in turn coaxial with a counterbored hole 24 through body section 15. The head of this cap screw 21 is received in the counterbored outer end of hole 24 and the threaded end of the shank of this cap screw is threadedly received in the internally threaded recess 22. By tightening these cap screws 21, the various body sections can be clamped together very tightly so that the opposing and contacting surfaces coplanar with planes A—A and B—B are in sealing engagement.

Body section 15 is shown as having a second flat surface 25 engaging a flat surface 26 on an adapter 28. The unitized body sections 13–15 are shown joined to the adapter 28 by a plurality of cap screws 29 and 30, three such cap screws 29 and two such cap screws 30 being shown in FIG. 4. Cap screws 29 are longer than cap screws 30. Cap screws 29 have their heads shown as bearing against an outer flat surface 31 on body section 13 and their shanks extending through aligned holes in body sections 13–14, such aligned holes being collectively represented by the numeral 32, and the threaded ends of the shanks of these cap screws are threadedly received in internally threaded recesses 33 provided in adapter 28. Cap screws 30 have their heads shown as bearing against a recessed outer surface 34 and their shanks extending through aligned holes provided in body sections 13–15 and the threaded end of their shanks threadedly received in internally threaded recesses provided in adapter 28, in a manner similar to that described for cap screws 29.

Adapter 28 is shown as having a horizontal flat surface 35 contacting a flat surface 36 on the injection head of engine 11. This adapter 28 is shown as having suitable outwardly extending attaching flanges 38 provided with holes through which cap screws 39 extend and have their shanks threadedly received in internally threaded recesses provided in engine 11.

Referring to FIGS. 2 and 4, body section 13 is shown as internally formed to provide a fuel inlet chamber 40 on one side and an oxidizer inlet chamber 41 on the opposite side. Fuel inlet chamber 40 is shown as formed by a recess 42 in a flat surface 43 on body section 13, this surface extending generally at right angles to the surface 16 of this body section. Adjacent its outer end, recess 42 is shown as being internally threaded to receive the inner end of a fitting 44 which is tubular to allow fuel to be admitted from a line (not shown) suitably connected to the outer end of fitting 44. Fitting 44 is shown as carrying a cup-shaped screen 45 at its inner end for filtering the fuel admitted through fitting 44.

Recess 42 is shown as communicating with the outer end of a horizontal passage 46, the inner end of which communicates with the lower end of another recess 48 in surface 43 of body section 13. At the juncture of the inner end of horizontal passage 46 and the lower end of recess 48, inlet chamber 40 has a lateral branch passage 49 which opens to surface 16 of body section 13. Fuel inlet chamber 40 is collectively made up of recess 42, passage 46, recess 48 and passage 49.

Similarly, inlet chamber 41 for oxidizer is shown as having a recess 50 in surface 43 of body section 13 and receives a fitting 51 carrying a filter screen 52 at its inner end. Recess 50 communicates with the outer end of a horizontal passage 53 the inner end of which communicates with the lower end of another recess 54 in surface 43 of body section 13. At the juncture between the inner end of passage 53 and the lower end of recess 54, chamber 41 has a lateral passage 55 which opens to flat surface 16 of body section 13.

For oxidizer inlet chamber 41, body means 12 has seat means adapted to be closed by closure means, such means being represented generally by the reference numerals 56 and 58, respectively. Such closure means is suitably mounted on the lower end of a flapper 59 partially arranged in recess 54 and projecting upwardly past body surface 43.

Similarly, body means 12 is formed to provide seat means 57 associated with fuel inlet chamber 40 and adapted to be closed by closure means 60 (FIG. 6) suitably mounted on the lower end of a flapper 61 which is similar to flapper 59. Flapper 61 is partially arranged in recess 48 and projects upwardly past body surface 43. The upper end of each flapper 59 and 61 is shown as having a cylindrical enlargement 62 adapted to be press-fitted and sealingly arranged in a cylindrical collar 63 formed on the upper end of a flexure tube means or member 64 having an intermediate flexible thin-walled cylindrical section 65 and an integral enlarged cylindrical lower end attaching portion 66 adapted to be press-fitted and sealingly arranged in the slightly enlarged cylindrical upper end of corresponding recess 48 or 54. In this manner, the flexure tube members 64 are sealingly mounted on body means 12 so as to communicate internally only with the corresponding one of the chambers 40 and 41, and are also sealingly connected to their respective flappers 59 and 61. The flexure tube members 64 by reason of their thin-walled sections 65 can be bent or flexed to allow frictionless pivotal movement of the flappers 59 and 61 relative to body means 12 about a pivotal axis intermediate the length of sections 65 and thereby movement of the valve closure means 58 and 60 relative to their respective seat means 56 and 57, as will be explained later herein.

While any suitable means may be provided for moving the flappers 59 and 61 in unison, such means are shown as comprising an electrical force motor such as a torque motor represented generally by the numeral 68. This motor 68 is shown as including an armature 69 having two arms 70 and 71 extending laterally and in mutual alignment from a central upstanding portion 72 provided with a pair of transversely spaced cylindrical holes 73 which sealingly receive severally the cylindrical collar enlargements 63 on the upper ends of flexure tube members 64.

The motor 68 is also shown as including a pair of electromagnetic coils 74 and 75 surrounding the armature arms 70 and 71, respectively. These coils 74 and 75 are shown as being arranged in a lower pole piece 76 having upturned ends 78 and 79 which are opposed and are spaced from the downturned ends 80 and 81 of an upper pole piece 82. Also arranged between the pole pieces 76 and 82 is a pair of permanent magnets 83, 83 (FIG. 4). The assembly comprising the pole pieces 76 and 82, the permanent magnets 83, 83 and the coils 74 and 75 is fastened to body means 12 by a plurality of fastening screws 84 in a well known manner. Shims 85 are inserted between the lower pole piece 76 and the upper body flat surface 43 to dispose this described motor assembly in the desired angular position relative to the valve body means 12 so as to preferably bias valve closure means 58 and 60 against their respective seat means 56 and 57.

The motor 68 is encased by a removable cover 88 having a rim which sealingly engages flat surface 43 of body means 12. Attaching flanges 89 are formed integrally at the corners of the cover and each such flange from its underside is provided with an internally threaded recess to receive the externally threaded end of the shank of a fastening screw 90 which extends upwardly through a hole in a plate-like portion 91 of body section 13 which provides flat surface 43. The lead wires (not shown) for the electromagnetic coils 74 and 75 terminate in an electrical connector or receptacle 92 suitably removably attached to cover 88.

Figures 6, 7, 8:
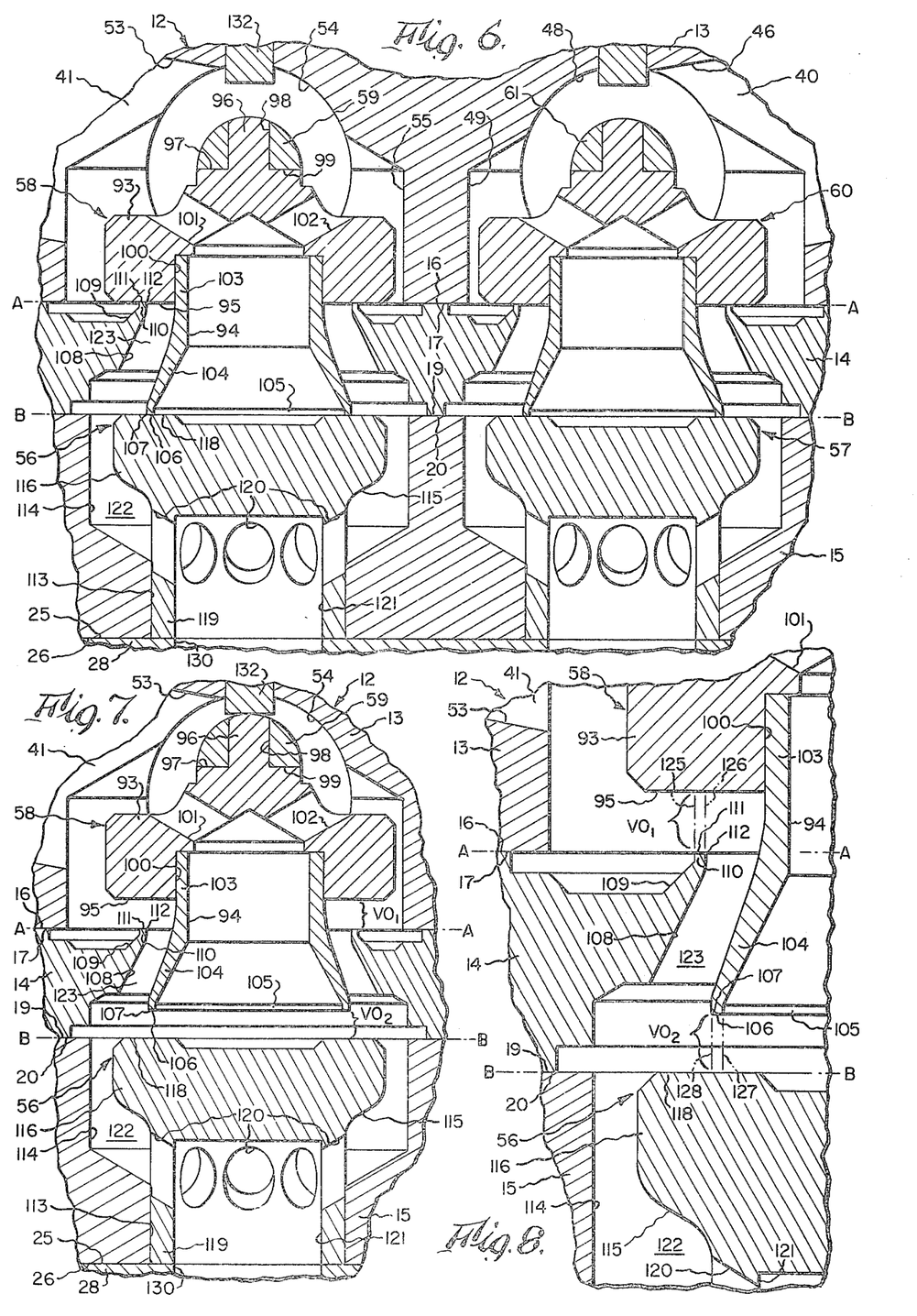
FIG. 6 is a further enlarged fragmentary sectional view of the control valve taken generally on line 6—6 of FIG. 2 and showing the poppet-type valves in a closed condition.
FIG. 7 is a view similar to the left hand portion of FIG. 6 and showing the left poppet-type valve in an open condition.
FIG. 8 is a still further enlarged fragmentary view of the left hand portion of FIG. 7 and illustrating certain characteristics of the variable orifices provided when the left twin poppet valve is open.

The valve closure means 58 provided on the lower end of flapper 59, and the cooperating seat means 56 provided by body means 12 will now be described. At this point, it is to be noted that the valve closure means 60 are identical to the closure means 58, as are also the seat means 57 identical to the seat means 56. Hence, the closure means 58 will be described in detail but the description thereof will be equally applicable to the closure means 60. Similarly, a detailed description of seat means 56 which cooperate with closure means 58 will be given and is intended to apply as well to seat means 57 which cooperate with closure means 60. These various means are best shown in FIGS. 6 and 7. Referring to FIGS. 6 and 7, closure means 58 is a twin poppet-type valve button shown as a two-part member including a first or head part 93 and a second or nozzle part 94. Part 93 has an annular flat surface 95 on one side and on its opposite side has an outwardly projecting stem 96 and an annular flat shoulder 97 at the base of such stem. This stem is adapted to be received in a hole 98 formed in flapper 59 adjacent its lower end which is also provided with a flat surface 99 adapted to abut flat surface 97 on closure part 93. The stem 96 can be welded or otherwise suitably rigidly connected to flapper 59. A cylindrical recess 100 is provided in flat surface 95. The inner end of this recess 100 is shown as connected by a pair of inclined laterally extending holes 101 and 102 leading to the exterior of part 93 on diametrically opposite sides of stem 96 and communicating with oxidizer inlet chamber 41.

The second closure part 94 is shown as having a cylindrical inner tubular portion 103 integrally connected by an outwardly flaring or tapered intermediate portion 104 to a cylindrical rim portion 105. This rim portion has an axially facing annular flat rim surface 106 defined by a circular outer edge 107. Inner portion 103 is received in recess 100 and can be welded to part 93 or otherwise suitably rigidly connected thereto.

Turning attention now to body means 12 providing twin seats of means 56 for parts 93 and 94 of closure means 58, intermediate body section 14 is shown as having a through-opening 108 extending between its surfaces 17 and 19. This opening 108 gradually enlarges transversely toward surface 19. Body section 14 is further shown as provided with an annular recess 109 in surface 17 thereof and surrounding opening 108 so as to leave therebetween a cylindrical seat portion 110 having a flat annular rim surface 111 defined by a circular inner edge 112. Rim surface 111 serves as a stationary seat adapted to be engaged by flat surface 95 on movable closure means 58.

Body section 15 is shown as provided with a counterbored cylindrical passage 113 extending between its surfaces 20 and 25. The enlarged portion 114 of passage 113 is adjacent surface 20. Body section 15 is shown as also including a pedestal member 115 having an enlarged cylindrical head 116 having a flat upper surface 118, and also including a tubular cylindrical neck portion 119 which is press-fitted into the narrow lower end of passage 113 and is suitably rigidly connected to body section 15 as by welding. Surface 118 serves as a stationary seat adapted to be engaged by flat rim surface 106 on movable closure means 58.

Adjacent head portion 116, tubular neck portion 119 is shown as provided with an annular series of upwardly and outwardly inclined holes 120. These holes 120 communicate the bore 121 of neck portion 119 which serves as an outlet with the outlet chamber 122 provided by the annular space between the wall of passage 114 and the exposed portion of the exterior of pedestal member 115. The annular space between the wall of opening 108 and the exposed portion of the exterior of nozzle part 94 provided a tubular outlet passage 123 communicating with tubular outlet chamber 122.

The valve is shown closed in FIG. 6 but open in FIG. 7. Referring to FIG. 7, and particularly to FIG. 8 which is an enlargement of the left portion of FIG. 7, it will be seen that the unseating of valve closure part 93 by its movement away from seat 111 provides a variable orifice $VO_1$ having an upstream outer side, represented by the broken line 125, and a downstream inner side, represented by the broken line 126. Similarly, when valve closure part 94 is unseated by its movement away from seat 118 a variable orifice $VO_2$ is provided having an upstream inner side, represented by the broken line 127, and a downstream outer side, represented by the broken line 128.

When the valve closure means 58 are unseated, as depicted in FIGS. 7 and 8, it will be seen that the upstream outer side 125 of variable orifice $VO_1$ communicates with inlet chamber 41, and the downstream inner side 126 communicates with the upper end of tubular outlet passage 123 which in turn communicates with the upper end of tubular outlet chamber 122. Also, the upstream inner side 127 of variable orifice $VO_2$ communicates via the passage means provided by the bore of tubular nozzle part 94 and holes 101 and 102 with inlet chamber 41. The downstream outer side 128 of variable orifice $VO_2$ communicates with tubular outlet passage 123 adjacent its lower end which in turn communicates with the upper end of tubular outlet chamber 122. Through the holes 120, chamber 122 communicates with outlet 121.

Referring to FIG. 2, this outlet 121 communicates with a passage 130 extending between the surfaces 26 and 35 of adapter 28. Passage 130 in turn communicates with a passage 131 in the injector head of rocket engine 11.

The cross-sectional area of tubular outlet passage 123 is dimensioned so as to conduct away from variable orifice $VO_1$ the fluid passed thereby. Adjacent its downstream end, or lower end as viewed in FIGS. 7 and 8, this passage 123 is sufficiently enlarged in cross-sectional area to handle the additional flow of fluid passed by variable orifice $VO_2$. As well, the cross-sectional area of tubular outlet chamber 122 is adequately dimensioned to handle the combined flow of fluid passed by orifices $VO_1$ and $VO_2$.

In a propellant valve, it is imperative that complete seal-off is achieved when the valve is closed. The quality of seal-off can be assessed by the leakage of pressurized gas across the seat since gas will leak across a seat much before a liquid will. Typically, in the valve illustrated, the seat leakage is less than 5 specific cubic centimeters of gaseous nitrogen per hour when pressurized with several hundred pounds per square inch. To achieve this degree of sealing, the mating surfaces between the closure and seat elements must be carefully provided so that the desired effective sealing is achieved.

Broadly speaking, to achieve the desired sealing, it is essential that the mating valve surfaces 95 and 111 lie in the plane of sealing A—A. Likewise, it is essential tat the mating valve surfaces 106 and 118 lie in the plane of sealing B—B. This is preferably achieved in the following manner. The poppet-type closure means 58 are suspended by a frictionless flexure tube support so that such means swing in an arc about the flexure tube pivot which is somewhere intermediate the length of the thin-walled section 65 of the flexure tube means 64. This arc, together with manufacturing tolerances, precludes the finishing of seats as separate parts, inasmuch as the geometry of the seat closure when the elements are assembled may not coincide in the plane of sealing.

In order to provide the required coplanar arrangement of the various surfaces mentioned hereinabove with respect to the planes of sealing A—A and B—B, the following assembly and finishing technique is recommended and preferred. The closure part 93 is first assembled to its flapper 59 and flexure tube member 64 and this member is mounted on the valve body means 12. At this time the other closure part 94 is not mounted on closure part 93. The closure surface 95 and body surface 16 are now lapped so as to be coplanar. Likewise, the intermediate body section 14 before assembly to body section 13 has its surfaces 17 and 111 lapped so as to be coplanar. The closure part 94 is now assembled and secured to closure part 93. Thereafter, with the intermediate body section 14 pressed against the body section 13 so that the surfaces 16 and 17 meet, as do also the surfaces 95 and 111, the surfaces 19 and 106 are lapped so as to be coplanar. Also, before assembly, the body section 15 is lapped so that its surfaces 20 and 118 are coplanar. The body section 15 is then placed against body section 14 and the assembly of body sections 13–15 is clamped together by application and tightening of the clamping screws 21.

The outside diameter of outer rim edge 107 is slightly less than the inside diameter of inner rim edge 112 so that nozzle part 94 can pass through the narrow end of through-opening 108 in intermediate body section 14, during assembly and disassembly of the control valve.

It will thus be seen that when the twin poppet valve is closed, the surfaces 95 and 111 providing one poppet valve are coplanar with each other and with the plane of sealing A—A. Likewise, when the valve is closed, the surfaces 106 and 118 providing the other poppet valve are coplanar with each other and lie in the plane of sealing B—B.

It will also be observed that by reason of the radial narrowness of rim surfaces 106 and 111 and their closeness in diameter the twin poppet valve is substantially pressure balanced, with a slight preponderance of force in a closing direction as is preferred. More specifically, upstream fluid pressure tends to close variable orifice $VO_1$ and tends to open variable orifice $VO_2$.

What has been described above in connection with valve closure means 58 and the associated seat means 56 therefor applies with equal force and effect to the valve closure means 60 and the associated seat means 57 therefor. It will be seen that when the various lapping operations are performed for the one valve, they can be performed simultaneously for the other valve. In this manner, the two valves will simultaneously open and close which is highly important, particularly for a bipropellant valve which must open and close its valves simultaneously to control the flow of fuel and oxidizer.

In this connection, it will be noted that the armature 69 will move flappers 59 and 61 in unison, thereby achieving substantially concurrent opening or closing of the valves. The valve closure means may be biased toward a closed condition by suitable thicknesses of the shims 85. The opening of the valve closure means to their respective maximum open position can also be limited by closure stop pins such as shown at 132 projecting severally into inlet chambers 40 and 41 to engage the lower end of the corresponding flapper in such chamber on the side opposite from its valve closure means.

As is well known to those skilled in the art, when the coils 74 and 75 of a bipropellant valve of the general type disclosed hereinabove are energized by a suitable electrical signal input, they will cause the armature 69 to pivot in a counterclockwise direction as viewed in FIG. 2 about an intermediate imaginary fulcrum arranged intermediate the longitudinal extent of the thin-walled portions 65 of these flexure tube members 64. This will cause the closure means 58 and 60 to be lifted off their respective seat means 56 to 57. The extent to which the closure buttons may be so lifted off their seats is determined by the stop pins 132. When a valve is open as depicted in FIGS. 7 and 8 typically, it will be seen that fluid, whether it be fuel or oxidizer, will flow through the variable orifices $VO_1$ and $VO_2$. The passages formed in the body means 12 surrounding the movable closure means are such that the streams of fluid passed by the variable orifices $VO_1$ and $VO_2$ may join together without impeding one another to provide a cumulative discharge of fluid toward outlet 121.

Figure 9:
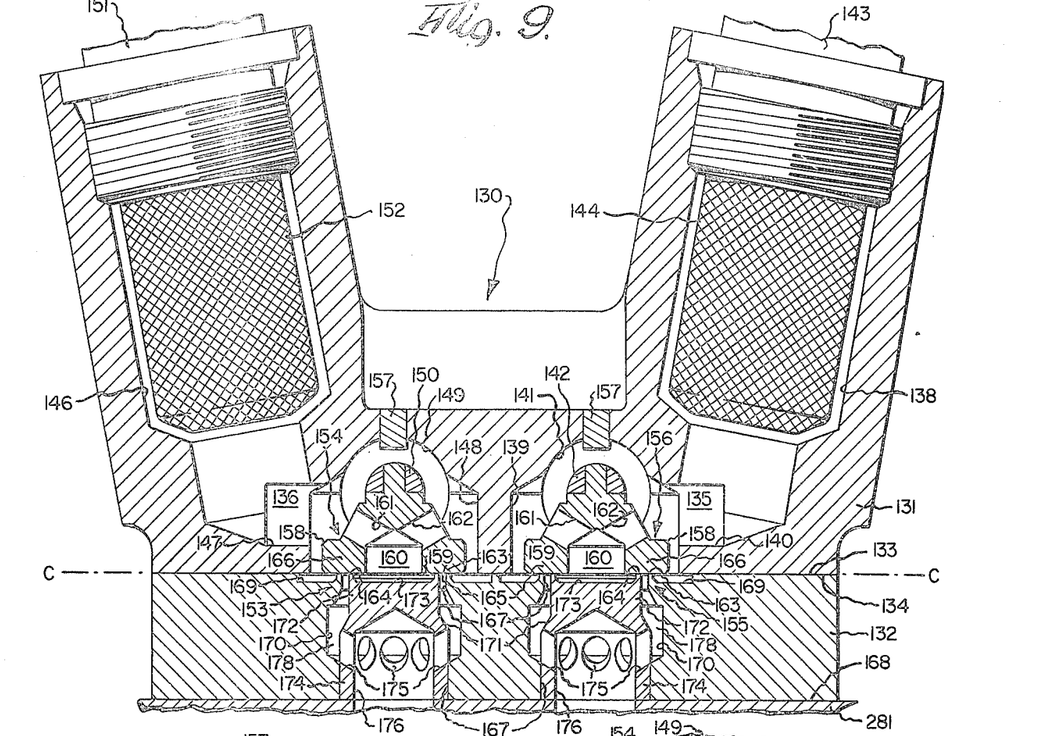
FIG. 9 is a fragmentary sectional view, similar to FIG. 6, but of another form of the inventive control valve characterized by having its valve seats coplanar.
Figure 10:
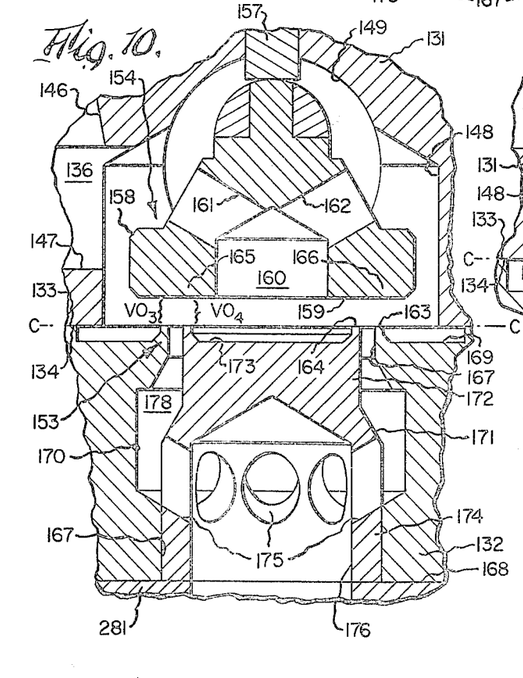
FIG. 10 is a view similar to the left hand portion of FIG. 9 and showing the left poppet-type valve is an open condition.
Figure 11:
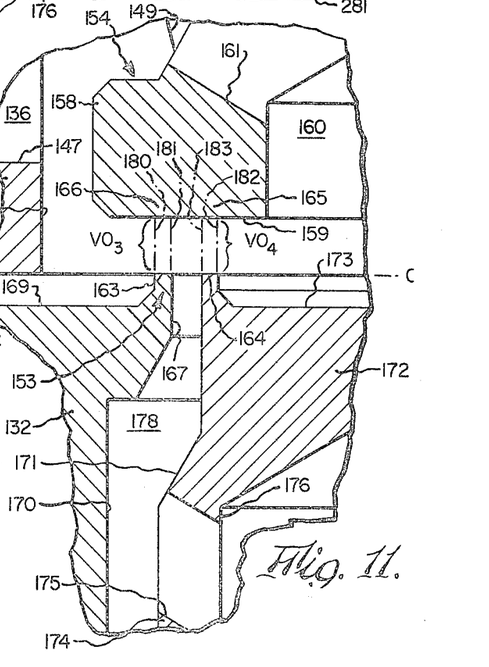
FIG. 11 is a further enlarged fragmentary view of the left hand portion of FIG. 10 and illustrating the variable orifices provided when the left twin poppet valve is open.

(Coplanar Valve Seats — Figs. 9 to 11)

As previously indicated hereinabove, there may be instances where the loss of pressure balancing forces may be acceptable in order to achieve the saving in manufacturing cost by providing a control valve having coplanar valve seats, instead of offset valve seats as with the form of the invention illustrated in FIGS. 1 to 8.

A direct-acting two-way control valve having coplanar valve seats, also intended as a bipropellant valve, is illustrated in FIGS. 9–11. Referring to these FIGS., the numeral 130 represents a body means generally including a first body section 131 and a second body section 132. These body sections 131 and 132 have opposing and contacting flat surfaces 133 and 134, respectively, to provide a plane of sealing C—C, and are suitably clamped together as by cap screws (not shown) similar to cap screws 21. Body means 130 may be suitably secured to an adapter 281 similar to adapter 28.

Body section 131 is shown as internally formed to provide a fuel inlet chamber 135 on one side and an oxidizer inlet chamber 136 on the opposite side. Fuel inlet chamber 135 is shown as formed by an inclined recess 138 communicating at its inner end with a recess 139 in surface 133 through an intermediate lateral recess 140 in the wall forming recess 139, the latter also being intercepted by a recess 141 in which a flapper 142 is arranged. In other words, communicating recesses 138–141 collectively provide inlet chamber 135. The outer end of recess 138 has a fitting 143 mounted therein carrying a filter screen 144, these elements being similar to the corresponding elements 44 and 45.

Similarly, inlet chamber 136 for oxidizer is shown as having an inclined recess 146 communicating with a lateral recess 147, in turn communicating with a recess 148 in surface 133, in turn communicating with a recess 149 in which a flapper 150 is arranged. A fitting 151 and filter screen 152 are arranged in recess 146.

For oxidizer inlet chamber 136, body means 130 has seat means 153 adapted to be closed by closure means 154. The corresponding seat means and closure means for fuel inlet chamber 135 are represented generally by the reference numerals 155 and 156, respectively.

Each of closure means 154 and 156 is shown as being in the form of a button member 158 mounted on one end of its respective flapper 150 or 142. These flappers are mounted on flexure tube members and pivoted by electromagnetic actuation means similar to that described in connection with the form of invention described hereinabove and illustrated in FIGS. 1–8. A stop pin 157 is provided to limit the valve opening movement of each flapper 142 or 150.

Each closure button member 158 is shown as having a flat surface 159 surrounding a recess 160 which communicates at its inner end with a pair of laterally inclined holes 161 and 162 severally leading to the corresponding inlet chamber 135 or 136.

Each of seat means 153 and 155 is shown as formed on body section 132 and includes an outer flat annular surface 163 and an inner annular surface 164, both such surfaces being coplanar with each other and also with body surface 134 so as to lie in the sealing plane C—C. Seat surfaces 163 and 164 are shown an engaged by annular closure surface 159 when coplanar with body surface 133 and hence lying in sealing plane C—C. This annular closure surface 159 is defined by inner and outer concentric circular edges, the radial spacing between which is large enough so as to provide an inner closure part 165 opposing and overlying inner seat 164, and an outer closure part 166 opposing and overlying outer seat 163.

The inner boundary of outer seat 163 is shown as circular and defined by one end of a cylindrical through-opening 167 provided in body section 132 extending from its surface 134 to its opposite surface 168. The outer boundary of this outer seat 163 is also shown as circular and defined by the edge of an annular recess 169 in surface 134. The intermediate portion of through-opening 167 is shown as enlarged as indicated at 170.

Body section 132 is also shown as including a pedestal member 171 having a cylindrical head portion 172 centrally cylindrically recessed at one end, as indicated at 173, to leave an outstanding annular part having concentric inner and outer circular edges defining a rim surface which provides inner annular seat surface 164. The opposite integral end portion of pedestal member 171 is shown as being enlarged to provide a cylindrical tubular portion 174 which is preferably press-fitted into the end portion of body opening 167 adjacent its surface 168 and is suitably rigidly connected to body section 132 as by welding.

Adjacent head portion 172, tubular portion 174 is shown as provided with an annular series of upwardly and outwardly inclined holes 175. These holes 175 communicate the bore 176 of tubular portion 174 which serves as an outlet with a tubular outlet chamber 178 provided by the annular space between the wall of opening 167, 170 and the exposed portion of the exterior of pedestal member 171.

The control valve is shown closed in FIG. 9 but open in FIG. 10. Referring to FIG. 10, and particularly to FIG. 11 which is an enlargement of the left portion of FIG. 10, it will be seen that the seating surfaces, collectively indicated at 159, of closure parts 165 and 166 are coplanar and when unseated by movement away from coplanar seat surfaces 163 and 164 provide a pair of variable orifices, the outer one of which is indicated at $VO_3$ and the inner one of which is indicated at $VO_4$. Orifice $VO_3$ has an upstream outer side, represented by the broken line 180, and a downstream inner side, represented by the broken line 181. Orifice $VO_4$ has an upstream inner side, represented by the broken line 182, and a downstream outer side, represented by the broken line 183.

It is evident that upstream outer side 180 of variable orifice $VO_3$ communicates with inlet chamber 136, as does also the upstream inner side 182 of variable orifice $VO_4$ via recess 160 and holes 161, 162. The downstream inner side of orifice $VO_3$ and the downstream outer side of orifice $VO_4$ communicate with tubular outlet chamber 178. Through the holes 175, chamber 178 communicates with outlet 176.

In order to provide the highly effective sealing required, surfaces 133 and 159 must be coplanar, and surfaces 134, 163 and 164 must be coplanar. This is readily achieved by first mounting closure means 154 and 156 on their respective flappers 150 and 142, in turn supported on the body-supported flexure tube structure previously described. The closure surfaces 159 and body surface 133 are then lapped so as to be coplanar. Likewise, after pedestal members 171 are mounted on body section 132, seat surfaces 163 and 164 and body surface 134 are lapped so as to be coplanar. Body section 132 is then placed against body section 131 with body surfaces 133 and 134 contacting and these two body sections are then suitably secured together.

It will thus be seen that when the twin poppet valve is closed, as depicted in FIG. 9, the surfaces 159 and 163 providing one poppet valve are coplanar with each other and with the plane of sealing C—C. Also, when the control valve is in such a closed condition, the surfaces 159 and 164 providing the other poppet valve are coplanar with each other and lie in the plane of sealing C—C.

It will be observed that upstream fluid pressure tends to close variable orifice $VO_3$ and tends to open variable orifice $VO_4$. These opening and closing forces are not equal, however, because upstream pressure acts in a valve closing direction over a larger area due to the difference between the outside diameter of orifice $VO_3$ and the inside diameter of orifice $VO_4$. While it is desirable to minimize this difference in order to maximize pressure balance on the twin poppet valve, as a practical matter the radial spacing of the walls which define the mouth of tubular outlet chamber 178 between orifices $VO_3$ and $VO_4$ must be adequate to handle the flow passed by these orifices. However, if the lack of pressure balance can be tolerated, its disadvantage may be outweighed by the advantage and resultant manufacturing cost saving in providing all engaging surfaces in the single sealing plane C—C.

Other than the structural differences noted, the coplanar valve seat form of control valve disclosed in FIGS. 9–11 operates in the same manner as the offset valve seat form of control valve disclosed in FIGS. 1–8 and the description herein of the mode of operation of the offset valve seat form is intended to apply also to the coplanar valve seat form.

While the invention has been illustrated and described specifically in connection with bipropellant valve embodiments, it will also be understood that the invention can be embodied in a monopropellant valve, or in any other type of direct-acting two-way control valve.

Inasmuch as modifications and changes may occur to those skilled in the art without departing from the spirit of the present invention, the preferred embodiments shown are illustrative and not limitative of the invention the scope of which is to be measured by the appended claims.

What is claimed is:

1. In a direct-acting two-way control valve, the combination comprising valve body means having first and second seats and fluid inlet and outlet chambers, poppet-type valve closure means including a first part engaging said first seat and a second part engaging said second seat, and electromagnetic actuation means for unseating said closure means, relative movement between said first part and first seat providing a first variable annular orifice having an upstream outer side and a downstream inner side, relative movement between said second part and second seat providing a second variable annular orifice having an upstream inner side and a downstream outer side, said inlet chamber communicating with said upstream outer side of said first orifice, said closure means having an internal passage establishing communication between said inlet chamber and said upstream inner side of said second orifice, said outlet chamber communicating with said downstream side of each said orifice, said body means including first, second and third body sections, said first and second sections having opposing contacting flat surfaces coplanar with the plane of sealing between said first part and first seat, and said second and third sections having opposing contacting flat surfaces coplanar with the plane of sealing between said second part and second seat.

2. A direct-acting two-way control valve according to claim 1 wherein said first body section is recessed to provide said inlet chamber, said third body section has a tubular outlet chamber, said second body section has a through-opening communicating said inlet chamber with said tubular outlet chamber, said first seat is provided by an annular surface on said second body section surrounding said through-opening, said second closure part is tubular and separate from said first closure part but mounted thereon, the rim of said tubular part engaging said second seat, said tubular part extending into said through-opening in spaced relation to the surrounding wall thereof to provide a tubular passage communicating with said outlet chamber.

3. A direct-acting two-way control valve according to claim 2 wherein the outer transverse dimension of said rim is less than the inner transverse dimension of said annular surface.

4. A direct-acting two-way control valve according to claim 2 wherein said annular surface is defined by a circular inner edge, said tubular second closure part flares laterally outwardly in a direction toward said second seat, said rim is defined by a circular outer edge, the outside diameter of said outer edge being less than the inside diameter of said inner edge.

5. A direct-acting two-way control valve according to claim 2 wherein said third body section is provided with a counterbored passage and has a pedestal member arranged in said counterbored passage including an enlarged head and a tubular neck portion supporting said head in spaced relation to the surrounding wall of said counterbored passage to provide said tubular outlet chamber, said tubular neck portion having holes communicating its interior with said tubular outlet chamber.

* * * * *